United States Patent
Jones et al.

(10) Patent No.: US 8,056,206 B2
(45) Date of Patent: Nov. 15, 2011

(54) METHODS FOR MANUFACTURING FACE PLATES FOR GOLF CLUB HEADS

(75) Inventors: David D. Jones, Anthem, AZ (US); Les J. Bryant, Scottsdale, AZ (US); Xiaojian Chen, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 12/822,121

(22) Filed: Jun. 23, 2010

(65) Prior Publication Data

US 2010/0257721 A1 Oct. 14, 2010

Related U.S. Application Data

(63) Continuation of application No. 11/828,195, filed on Jul. 25, 2007, now abandoned.

(51) Int. Cl.
*B21D 39/00* (2006.01)
*A63B 53/04* (2006.01)

(52) U.S. Cl. ........ 29/458; 29/527.1; 29/527.2; 473/292; 473/342

(58) Field of Classification Search .............. 29/458, 29/527.1, 527.2; 473/131, 237, 292, 324, 473/340, 342
See application file for complete search history.

(56) References Cited

U.S. PATENT DOCUMENTS

| | | | |
|---|---|---|---|
| 4,974,851 A | 12/1990 | Closser |
| 5,425,535 A | 6/1995 | Gee |
| 5,460,377 A | 10/1995 | Schmidt |
| 5,588,923 A | 12/1996 | Schmidt |
| 5,597,361 A | 1/1997 | Hope |
| 5,674,132 A | 10/1997 | Fisher |
| 5,972,144 A | 10/1999 | Hsu |
| 6,425,831 B1 | 7/2002 | Heene |
| 6,508,902 B2 | 1/2003 | Lind |
| 6,729,972 B2 | 5/2004 | Boord |
| 6,875,124 B2 | 4/2005 | Gilbert |
| 6,951,518 B2 | 10/2005 | Solheim |
| 6,986,715 B2 | 1/2006 | Mahaffey |
| 6,988,879 B2 | 1/2006 | Ho |
| 7,048,648 B2 | 5/2006 | Breier |
| 7,335,006 B2 | 2/2008 | Wilson |
| 2001/0011821 A1 | 8/2001 | Lind |
| 2002/0025861 A1 | 2/2002 | Ezawa |
| 2003/0220157 A1 | 11/2003 | Dennis |
| 2005/0249900 A1 | 11/2005 | Barre |
| 2006/0145395 A1 | 7/2006 | Takigawa |
| 2006/0192321 A1 | 8/2006 | McBain |
| 2008/0083486 A1 | 4/2008 | Yang |

FOREIGN PATENT DOCUMENTS

| | | |
|---|---|---|
| JP | 2002315853 | 10/2002 |
| JP | 2006025948 | 2/2006 |

*Primary Examiner* — Jermie E Cozart (57) ABSTRACT

In one embodiment, a method of manufacturing a face plate for a golf club head comprises providing a label for the face plate of the golf club head, providing a mold apparatus, positioning the label in the mold apparatus, providing a mold compound in a non-solid form, positioning the mold compound over the label and in the mold apparatus, and changing the mold compound to a solid form defining the face plate after positioning the mold compound over the label and in the mold apparatus. Other examples, methods, and related apparatuses are disclosed herein.

20 Claims, 7 Drawing Sheets

METHODS FOR MANUFACTURING FACE PLATES FOR GOLF CLUB HEADS

CROSS-REFERENCE TO RELATED APPLICATION

This patent application is a continuation of U.S. patent application Ser. No. 11/828,195, filed on Jul. 25, 2007 which is now abandoned. The disclosure of the referenced application is incorporated herein by reference.

TECHNICAL FIELD

This disclosure relates generally to golf clubs, and relates more particularly to golf club heads comprising particularly designed face plates for golf club heads and methods of manufacturing a golf club head.

BACKGROUND

Golf clubs and specifically golf club heads of various designs have typically been developed to improve the functionality of the golf club. In particular, many golfers prefer golf clubs that provide sensory feedback, or a certain "feel" as they use the golf club. Providing sensory feedback is particularly helpful when using a putter because of the delicate nature of putting. During the putting stroke, if a golfer feels unwanted vibrations or hears unpleasing sounds when the putter contacts a golf ball, the golfer may be distracted, and he will not perform his best golf stroke. Golf club designs, and particularly golf club head designs comprising face plate inserts, may be used to optimize the sensory feedback to a golfer, as well as to provide a more aesthetically pleasing sound.

For simplicity and clarity of illustration, the drawing figures illustrate the general manner of construction, and descriptions and details of well-known features and techniques may be omitted to avoid unnecessarily obscuring the golf clubs and their methods of manufacture. Additionally, elements in the drawing figures are not necessarily drawn to scale. For example, the dimensions of some of the elements in the figures may be exaggerated relative to other elements to help improve understanding of embodiments of the golf clubs and their methods of manufacture. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of golf clubs and methods of manufacture described herein are, for example, capable of operation in sequences other than those illustrated or otherwise described herein. Furthermore, the terms "contain," "include," and "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "side," "under," "over," and the like in the description and in the claims, if any, are used for descriptive purposes and not necessarily for describing permanent relative positions. It is to be understood that the terms so used are interchangeable under appropriate circumstances such that the embodiments of golf clubs and methods of manufacture described herein are, for example, capable of operation in other orientations than those illustrated or otherwise described herein. The term "coupled," as used herein, is defined as directly or indirectly connected in a physical, mechanical, or other manner.

DESCRIPTION OF EXAMPLES OF EMBODIMENTS

In an embodiment of golf clubs and methods of manufacture, a method of manufacturing a face plate for a golf club head comprises providing a label, providing a mold apparatus, positioning the label in the mold apparatus, and providing a mold compound in a non-solid form. Manufacturing the face plate further comprises positioning the mold compound over the label and in the mold apparatus and changing the mold compound to a solid form after positioning the mold compound over the label and in the mold apparatus.

In another embodiment of golf clubs and methods of manufacture, the method of manufacturing a golf club may comprise the steps of the method of manufacturing the face plate, as described above, and may further comprise removing the face plate from the mold apparatus. The method of manufacturing the golf club may also comprise inserting the face plate into a face opening of a golf club head, securing the face plate into the face opening of the golf club head, and coupling the golf club head to a shaft.

In a further embodiment of the golf clubs and methods of manufacture, a golf club head can comprise a golf club head body comprising a face plate opening, a face plate in the face plate opening, an adhesive to secure the face plate in the face plate opening, and a filler material to fill a void in the face plate opening between the golf club head body and the face plate positioned in the face plate opening. In this embodiment, the face plate comprises a face plate body comprising a label molded to a mold compound in a mold apparatus, and the face plate body further comprises a rib circumscribing the face plate body.

Figure 1:
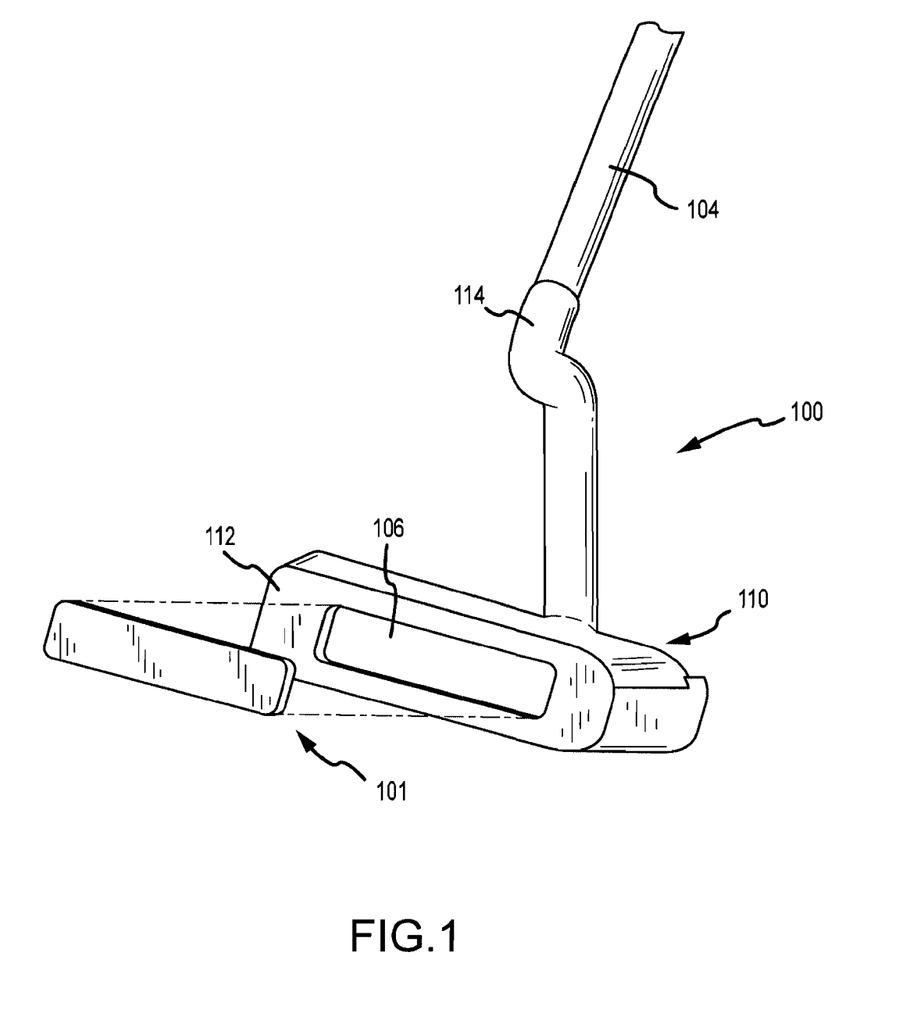
FIG. 1 illustrates an exploded perspective view of an exemplary golf club according to an embodiment of the golf clubs and methods of manufacture described herein.

Turning now to the figures, in one embodiment of the golf clubs and methods of manufacture described herein, and with reference to FIG. 1, a golf club 100 comprises a golf club head 110 coupled to a golf club shaft 104. The golf club head 110 comprises a golf club head body 112 having a face plate opening 106. The golf club head 100 further comprises a face plate 101 positioned and secured in the face plate opening 106. The face plate 101 comprises a label 220 (FIG. 2) affixed to a solidified mold compound 330 (FIG. 3), wherein molding the face plate 101 and affixing the label 220 (FIG. 2) are described in greater detail below. In one exemplary embodiment, the face plate 101 may be secured into the face plate opening 106 by any suitable means such as, adhesives, epoxy, glues, and the like.

Next, the golf club head 110 may be coupled to the golf club shaft 104 by any suitable means such as adhesives, welding, swaging and the like. In one embodiment, the golf club shaft 104 may be coupled directly to, for example, a bore (not shown) of the golf club head 110. In another exemplary embodiment, the golf club head 110 may further comprise a hosel 114, and the golf club shaft 104 may be coupled to the hosel 114, instead of to a bore. While the golf club 100 in this embodiment comprises a putter, other golf clubs are contemplated by the golf clubs and methods of manufacture described herein. For example, other golf clubs such as irons, drivers, fairway woods, hybrids, and/or other suitable types of clubs are considered. Additionally, the golf clubs and methods of manufacture described herein can be applied to other types of putter than those putters described herein.

Figure 2:
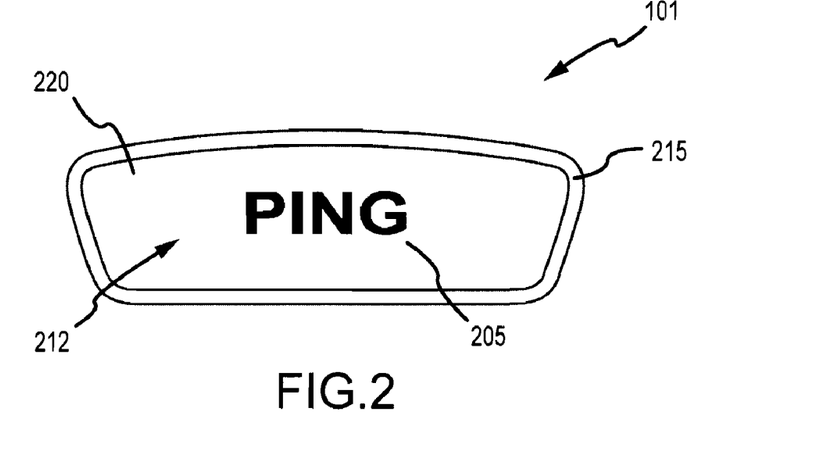
FIG. 2 illustrates a front view of an exemplary golf club face plate of the golf club in FIG. 1.
Figure 3:
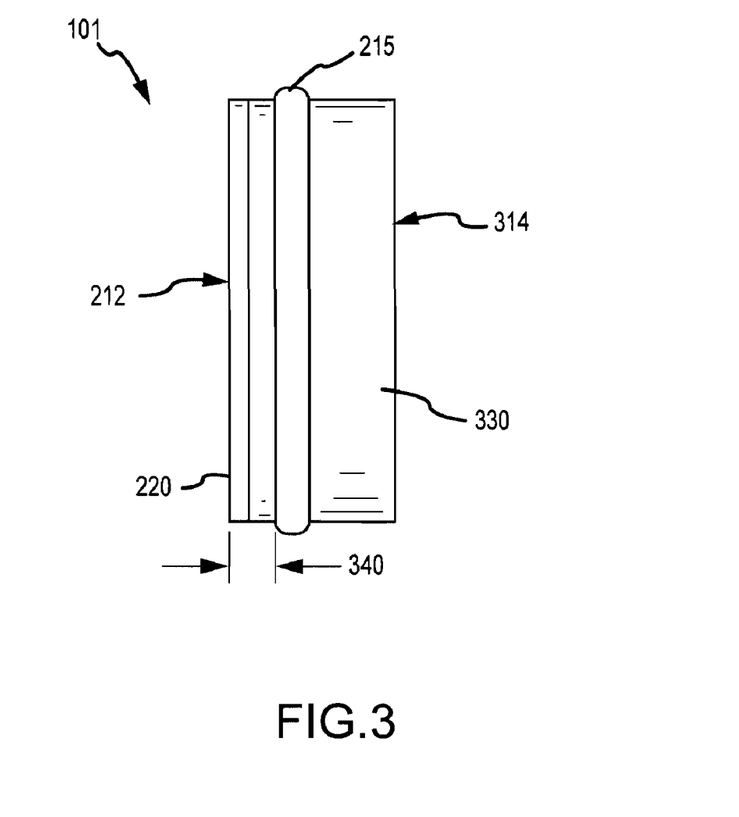
FIG. 3 illustrates a side view of the exemplary golf club face plate of FIG. 2.

Turning now to FIG. 2, the face plate 101 has the label 220. The face plate 101 may further comprise a rib 215 that circumscribes the face plate 101 and, in this embodiment, comprises a rib depth 340 (FIG. 3) such that the rib 215 lies approximately 2.0 millimeters away from a front face portion 212 of the face plate 101. While this exemplary embodiment contemplates the rib depth 340 to be approximately 2.0 millimeters from the front face portion, other rib depths are also contemplated. In an exemplary embodiment, the rib 215 may be integrally molded with the face plate 101, but other processes for providing the rib 215 are likewise contemplated herein. In another embodiment, the face plate 101 can be devoid of a rib like the rib 215, or the rib 215 can be located at only a portion or portions of the circumference of the face plate 101.

The face plate 101 further comprises printed indicia 205 on rear portion of the label 220. In this embodiment, the printed indicia 205 can indicate the manufacturer of the face plate 101, the golf club head 110 (FIG. 1), and/or the golf club 100 (FIG. 1), but the printed indicia may comprise other text, designs, or graphic characters. The printed indicia 205 may further comprise various shapes, colors, and/or font sizes. For example, text to promote sponsorship, ownership, and the like, or graphic characters to promote various novelty features or trademarks is contemplated. In one exemplary embodiment, the text or graphics may comprise markings such as, for example, alignment indicia, to facilitate performance of the golf game.

In providing the label 220 for the face plate 101, various printing process and label configurations are contemplated. For example, the label 220 may comprise a film that is at least translucent, and in one exemplary embodiment, the rim can be transparent. Further, a design may be printed on the film. Printing the design may further comprise printing ink for the design on a back side of the film, and in this embodiment, the front side of the label is the film, which protects the design. In this embodiment, the film is located between the ink of the design and the front face portion 212 of the face place 101. Printing the design may further comprise printing the design backwards, or printing the design may further comprise printing an additional layer over the design. In this embodiment, the additional layer may be white and may be used to bring out the colors in the design and to serve as the adhesive between the label 220 and a mold compound in a mold process described in greater detail herein.

The indicia 205 may be printed by any suitable process for printing. In one exemplary embodiment the printing process may comprise screen printing, and in one embodiment, after printing, the label 220 may be laser cut from a sheet of labels for more accuracy. In a laser cut embodiment, heat from the laser cutting process may adhere a liner 425 (FIG. 4) to the label 220 and may facilitate the elimination of air pockets between the liner 425 and the label 220. In other exemplary embodiments, however, stamping or die cutting the label 220 from a sheet of labels may be used. Among the various embodiments in which the label comprises the liner 425, the liner 425 may be used to increase the stiffness of the label 220 to prevent the label from deforming, wrinkling, or moving during an injection molding process. Moreover, the liner 425 may also provide extra stiffness during a screen printing process. The liner 425 can comprise a urethane material or other suitable material.

Figure 4:
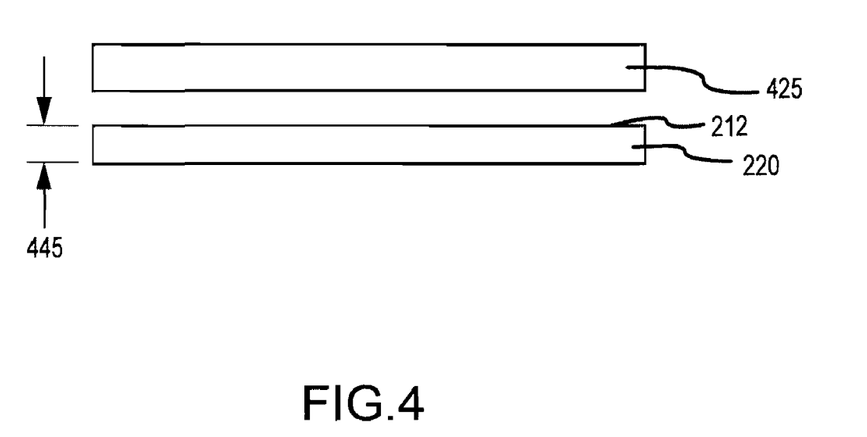
FIG. 4 illustrates a side view of an exemplary label of the golf club face plate in FIG. 2.

Among the various embodiments described herein, providing the label 220 comprises providing the label 220 to comprise a polyester-based material, providing the label 220 to comprise a urethane or polyurethane material, or providing the label 220 to comprise an aromatic material. In an exemplary embodiment, the urethane or polyurethane material may provide a better sound and "feel" for the golf club head 110 than conventional labels comprising other materials. In another exemplary embodiment, the label 220 comprises a polycarbonate material. Among the various embodiments described herein, the label 220 may be provided to comprise a label thickness 445 of approximately 0.120 millimeters to approximately 0.650 millimeters. In one exemplary embodiment, if the liner 425 is used, the label 220 may comprise a label thickness 445 closer to the lower end of the exemplary thickness range. In this embodiment, the liner 425 is located adjacent to the front portion 212 of the label 220, and the ink for the design of the label 220 is located adjacent to a rear portion 413 of the label 220. If the liner 425 is not used, then the label 220 may comprise a label thickness 445 closer to the upper end of the exemplary thickness range.

In an embodiment of golf clubs and methods of manufacture, the label 220 may comprise an adhesive layer that can be heat activated to bond to a mold compound during a molding process described in greater detail below.

Figure 5:
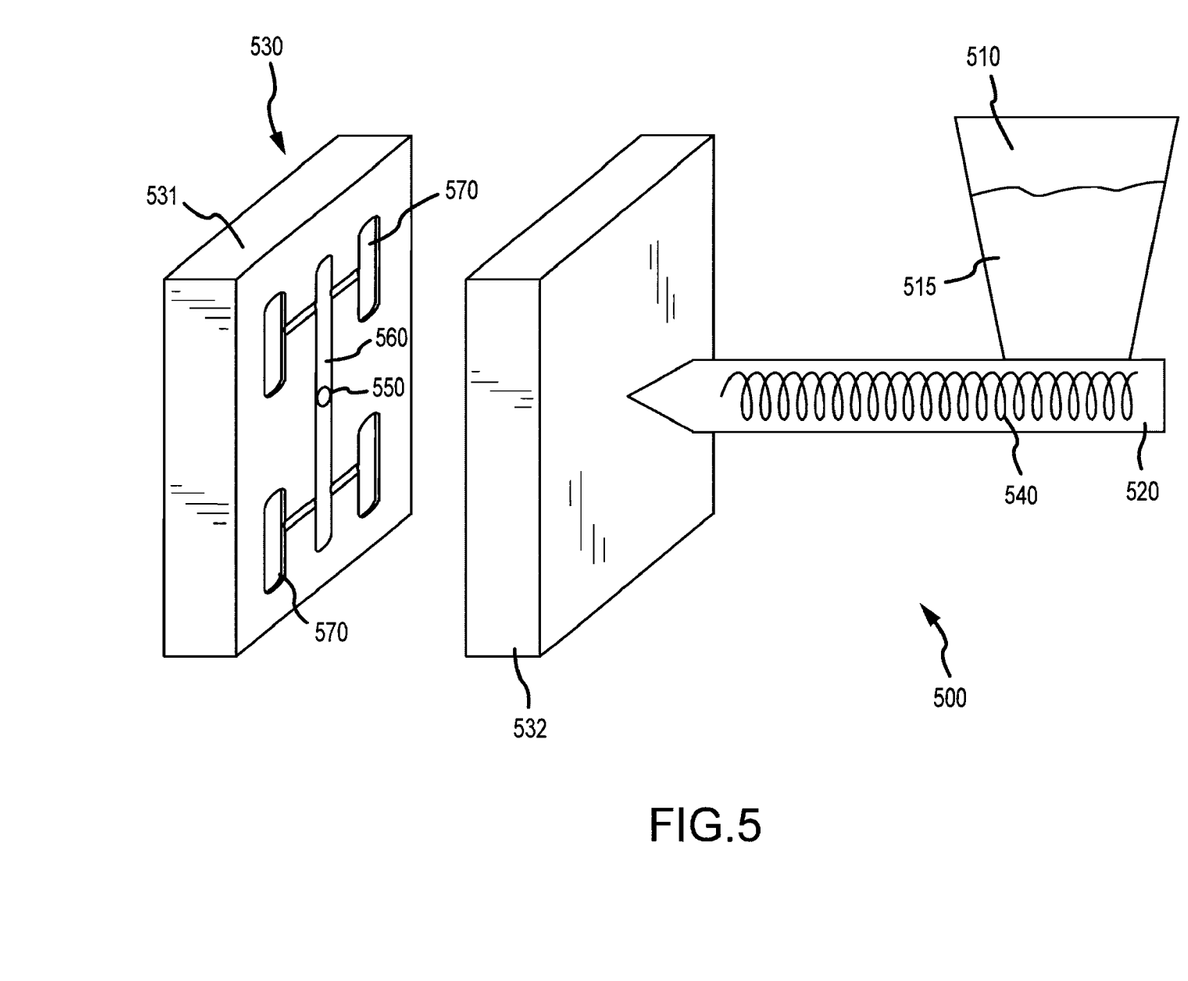
FIG. 5 illustrates a system view of the process to manufacture the exemplary golf club face plate of FIG. 2.

In an embodiment of golf clubs and methods of manufacture, and with reference to FIG. 5, a mold apparatus 500 may be used to facilitate the manufacture of a face plate as described herein. First, while a mold apparatus 500 described herein may be used to manufacture a face plate 101 (FIGS. 1-3), various other mold apparatuses and molding processes may be used to achieve the manufacture of the face plate 101 described herein. In this exemplary embodiment, an injection molding process is contemplated comprising a mold apparatus 500 that may comprise a hopper 510 to contain a solid form or other form of a mold compound 515. The hopper 510 may be coupled to a conduit 520, wherein the conduit 520 can transfer the mold compound 515 to mold plates 530. In one exemplary embodiment, the mold plate 530 can comprise two mold plates 531 and 532. In the same or a different embodiment, the conduit 520 comprises a screw mechanism 540 to advance the mold compound 515 from the hopper 510 to the mold 530, and heat applied to the conduit 520 along with friction created by the screw mechanism 540 converts the mold compound 515 from the solid form to a non-solid form such as, for example, a liquid. In one exemplary embodiment, the heat applied to the conduit 520 ranges from approximately 200 degrees Celsius to approximately 240 degrees Celsius.

In this exemplary embodiment, the mold plates 530 may further comprise a gate 550 between mold cavities 570 and runners 560. Also, the gate 550 may function to regulate the introduction of the non-solid mold compound into the mold cavities 570. In this embodiment, the runners 560 in the mold plates 530 are coupled to the conduit 520 to transfer the non-solid mold compound 515 to the mold cavities 570. In this embodiment, the mold plates 530 may be heated to a temperature that is less than the heat applied to the conduit 520 comprising the screw mechanism 540. For example, the mold plates 530 may be maintained from approximately 40 degrees Celsius to approximately 55 degrees Celsius. The temperature in the mold plates 530 may be controlled such that the thermal gradient facilitates solidification of the mold compound 515, which adheres the mold compound 515 to the label 220 that was inserted in the mold cavities 570 prior to introduction of the non-solid mold compound 515 to the mold plates 530. Once the solidification is complete, for example, after approximately 15 seconds to approximately 25 seconds, the mold plates 530 may be opened; the face plate 101 is removed from the mold cavities 570; and the mold compound 515 in the runners 560 and any excess mold flash can be trimmed from the face plates 101.

Among various molding processes, the gate 550 and/or runners 560 may be positioned or located at a center portion of the width (or longer dimension) of the individual mold cavity 570 to reduce the likelihood that the label 220 placed in the mold cavity 570 will wrinkle or move in the mold cavity 570 when the mold compound 515 is injected into the mold cavities 570. For example, if the gate 550 or runner 560 is positioned too close to the label 220, the force of the incoming mold compound 515 may wrinkle or displace the label within the mold cavity 570. In an exemplary embodiment of golf clubs and methods of manufacture, the gate 550 may be spaced at least 1.20 millimeters above the label 220 placed in the mold cavity 570. In an exemplary embodiment, the label 220 in the mold cavity 570 may be positioned such that the gate 550 is proximate to a center of a length of the label 220, if the length of the label 220 is greater than the width of the label 220. Among the various embodiments, the label 220 comprises a length of the label 220 to be greater than a width of the label 220. In this embodiment, four mold cavities 570 and a single gate 550 are illustrated in the mold plates 530, however, other numbers of mold cavities and gates are additionally contemplated.

Among the various molding processes described herein, providing the mold compound 515 (FIG. 5) comprises providing the mold compound 515 to comprise a polyester-based material, providing the mold compound 515 to comprise a urethane material, or providing the mold compound 515 to comprise an aromatic material. In addition, the mold compound 515 may further comprise a thermoplastic. In a different embodiment, the mold compound 515 is not a thermoplastic, but may comprise a thermoset. In another embodiment, the mold compound may be aliphatic and not aromatic. In still yet a different embodiment, the mold compound 515 comprises a polyether-based material. Among the various embodiments described herein, providing the mold compound 515 comprises providing a polyester-based, aromatic, polyurethane thermoplastic having a Shore D hardness value of approximately 65 to approximately 80.

Figure 6:
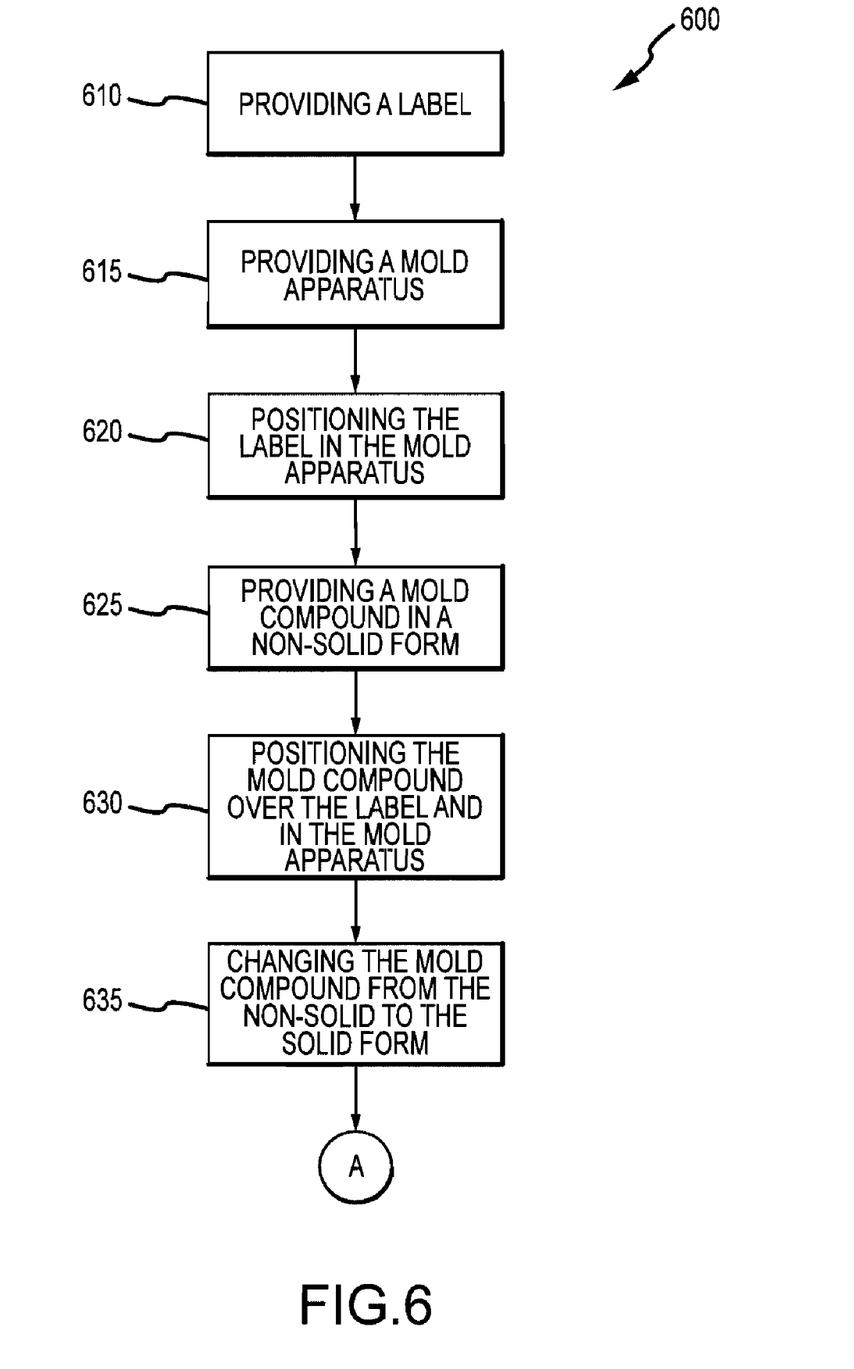
FIGS. 6 and 7 depict a flow diagram representation of one manner in which a golf club may be manufactured, according to an embodiment.

In an embodiment of golf clubs and methods of manufacture, and with reference to FIG. 6, a method 600 of manufacturing a golf club head 10 comprises providing a label (a block 610), providing a mold apparatus (a block 615), positioning the label in the mold apparatus (a block 620), providing a mold compound in a non-solid form (a block 625), positioning the mold compound over the label and in the mold apparatus (a block 630), and changing the mold compound from the non-solid form to the solid form (a block 635). In this embodiment, the face plate and the golf club head of the method 600 can be similar to the face plate 101 (FIG. 1) and the golf club head 110 (FIG. 1), respectively. Also, in this embodiment, the label provided in the block 610 may be similar to label 220 (FIG. 2) where the printing on the label is located on the rear of the label, and the mold apparatus of the block 615 may be similar to the mold apparatus 500, the mold plates 530, and/or the mold cavities 570 of FIG. 5. Additionally, positioning the label in the mold apparatus in the block 620 can further comprise placing the front portion of the label into a mold cavity in a mold plate such that the rear portion of the label faces out of the mold cavity. Furthermore, the mold compound of the block 625 can be similar to the mold compound 515 in FIG. 5.

Figure 7:
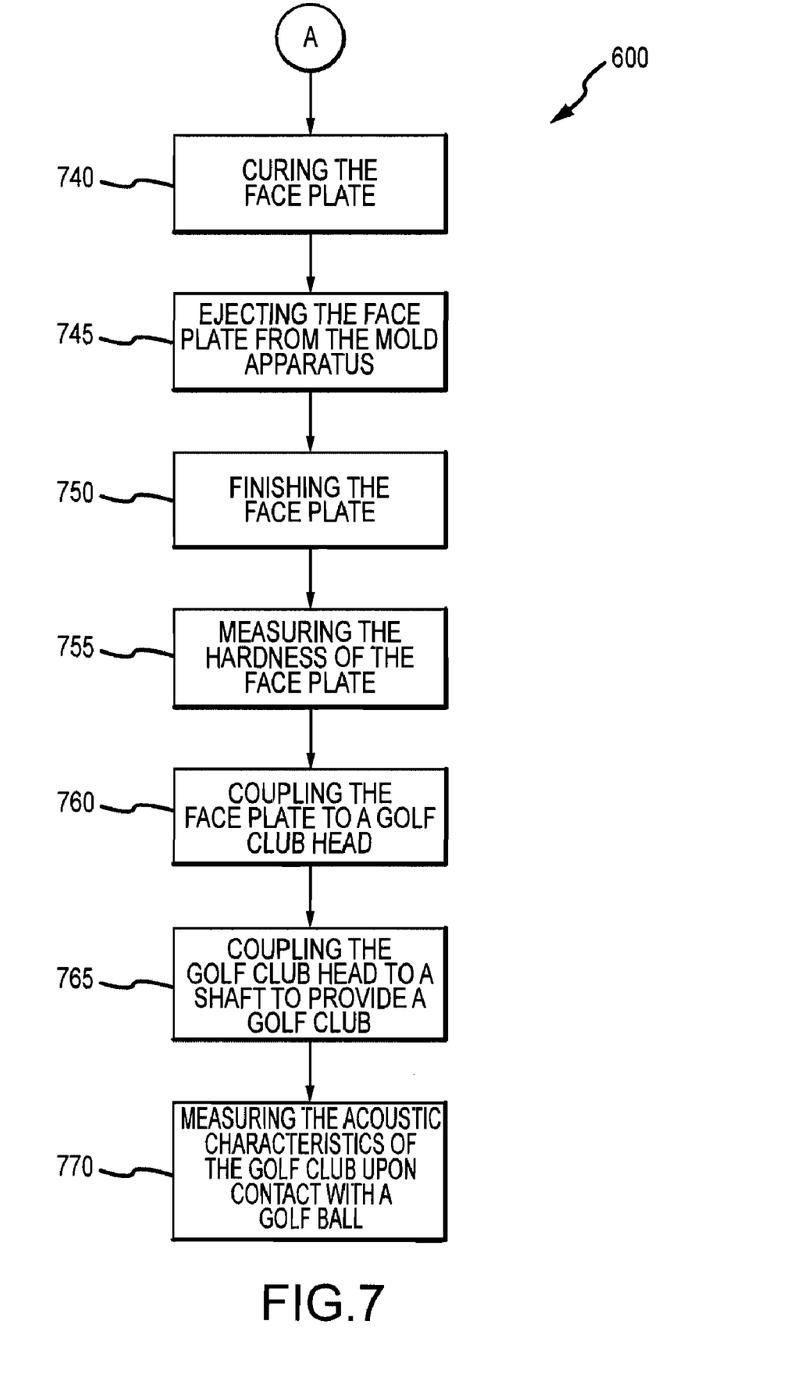

Returning to the method 600 of manufacturing a golf club head, and with reference to FIG. 7, the method 600 continues with curing the face plate after positioning the mold compound over the label and in the mold apparatus (a block 740), ejecting the face plate from the mold apparatus (a block 745), and finishing the face plate (a block 750). The method 600 may further comprise: measuring the hardness of the face plate (a block 755), coupling the face plate to a golf club head (a block 760), coupling the golf club head to a shaft (a block 765), and measuring the acoustic characteristics of the golf club upon contact with a golf ball (a block 770).

In this embodiment, curing the face plate after positioning the mold compound over the label and in the mold apparatus in block 740 may be similar to and/or include the solidification process in the mold plates 530 caused by the thermal gradient between the mold plates 530 and conduit 520 of FIG. 5 described above. Finishing the face plate in the block 750 may comprise removing any excess mold compound from the face plate, as described previously. Coupling the face plate to the golf club head in the block 760 may further comprise inserting the rear portion of the label of the face plate into an opening in the golf club head and leaving the front portion of the face plate facing out of the opening in the golf club head.

Measuring the hardness of the face plate in the block 755 can include using any suitable hardness testing procedure, for example, (American Society for Testing and Materials Standards) test number D2240 and/or (International Organization of Standardization) test method 868. In this embodiment, the face plate may comprise a Shore D hardness value from approximately 65 to approximately 80. Also, measuring the acoustic characteristics of the golf club upon contact with a golf ball in the block 760 can measure acoustical traits such as frequency, decibel level, pitch, tone, resonance, and the like.

Figure 8:
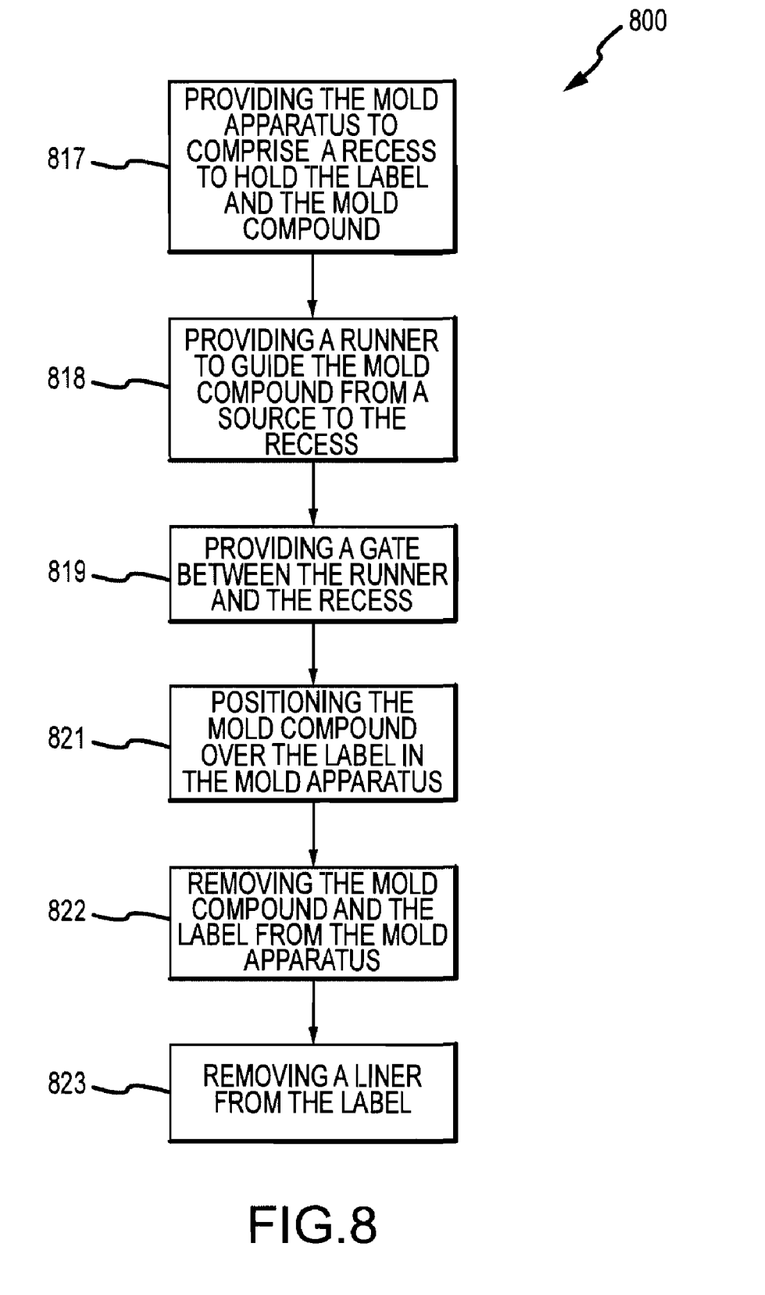
FIG. 8 depicts a flow diagram representation of one manner in which a golf club face plate may be manufactured, according to an embodiment.

In an embodiment of golf clubs and methods of manufacture, and with reference to FIG. 8 a method 800 is for manufacturing a face plate for a golf club head. The method 800 can be similar to or related to the method 600 (FIG. 6). For example, the method 800 can include more detailed steps of different portions of the method 600 (FIG. 6).

The method 800 can include providing the mold apparatus to comprise a recess to hold the label and the mold compound (a block 817), providing a runner to guide the mold compound from a source to the recess (a block 818), and providing a gate between the runner and the recess (a block 819). In this embodiment, the method 800 further comprises, positioning the mold compound over the label and in the mold apparatus (a block 821), removing the mold compound and the label from the mold apparatus (a block 822); and after removing the mold compound and the label from the mold apparatus, removing a liner from the label (a block 823).

Although a particular order of actions is illustrated in FIGS. 6-8, these actions may be performed in other temporal sequences. For example, the actions depicted in FIGS. 6-8 may be performed sequentially, concurrently, or simultaneously.

The providing steps in the described methods of FIGS. 6 and 7 may include designing and/or manufacturing processes or activities. Additionally, the block 615 can be performed before or after the blocks 610 and/or 625, and the block 625 can be performed before or after the blocks 610, 615, and/or 620. Moreover, as additional examples, the block 755 can be performed before or after the blocks 760, 765, and or 770. Other variations are also contemplated herein.

Additional examples of such changes have been given in the foregoing description. Accordingly, the disclosure of embodiments of golf clubs and methods of manufacture is intended to be illustrative of the scope of golf clubs and methods of manufacture and is not intended to be limiting. For example, in one embodiment, a golf club head may have one or more features of FIG. 1, with or without the features described with reference to FIGS. 2-4. Other permutations of the different embodiments having one or more of the features of the various figures are likewise contemplated. It is intended that the scope of golf clubs and methods of manufacture shall be limited only to the extent required by the appended claims.

The golf clubs and methods of manufacture discussed herein may be implemented in a variety of embodiments, and the foregoing discussion of these embodiments does not necessarily represent a complete description of all possible embodiments. Rather, the detailed description of the drawings, and the drawings themselves, disclose at least one preferred embodiment of golf clubs and methods of manufacture, and may disclose alternative embodiments of golf clubs and methods of manufacture.

All elements claimed in any particular claim are essential to golf clubs or methods of manufacture claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of manufacturing a face plate for a golf club head comprising:
   providing a label for the face plate of the golf club head;
   providing a mold apparatus;
   positioning the label in the mold apparatus;
   providing a mold compound in a non-solid form;
   positioning the mold compound over the label and in the mold apparatus; and
   changing the mold compound to a solid form defining the face plate after positioning the mold compound over the label and in the mold apparatus;
   wherein:
      providing the mold compound further comprises:
         providing the mold compound to comprise a polyester-based, aromatic, polyurethane, thermoplastic having a Shore D hardness value of approximately 65 to approximately 80.

2. The method of claim 1 further comprising:
   ejecting the face plate from the mold apparatus; and
   finishing the face plate;
   wherein changing the mold compound to a solid form comprises:
      curing the face plate.

3. The method of claim 1 wherein:
   providing the mold apparatus comprises:
      providing the mold apparatus to comprise:
         a recess to hold the label and the mold compound;
         a runner to guide the mold compound to the recess; and
         a gate between the runner and the recess to regulate introduction of the mold compound into the recess.

4. The method of claim 3 wherein:
   positioning the label in the mold apparatus comprises:
      positioning the label in the mold apparatus such that the gate is located above the label; and
      positioning the label in the mold apparatus such that the gate is adjacent to a center of a length of the label; and
   providing the label comprises:
      providing a length of the label to be larger than a width of the label.

5. The method of claim 1 wherein:
   providing the label comprises:
      providing a liner coupled to the label, the liner being removable from the label;
   and
   positioning the label in the mold apparatus comprises:
      positioning the label and the liner in the mold apparatus.

6. The method of claim 5, wherein:
   positioning the mold compound over the label and in the mold apparatus comprises:
      positioning the mold compound over the label and the liner in the mold apparatus;
   the method further comprising:
      removing the mold compound, the label, and the liner from the mold apparatus; and
      after removing the mold compound, the label, and the liner from the mold apparatus, removing the liner from the label.

7. The method of claim 5 wherein:
   positioning the mold compound over the label and in the mold apparatus comprises:
      positioning the mold compound over the label such that the label separates the liner from the mold compound.

8. The method of claim 5, wherein:
   providing the liner coupled to the label comprises:
      configuring the liner to restrict at least one of a deformation, a wrinkling, or a movement of the label when positioning the mold compound over the label.

9. The method of claim 1 wherein:
   positioning the mold compound over the label and in the mold apparatus comprises:
      adhering the mold compound to the label to form the face plate for the golf club head; and
   the golf club head is a putter head.

10. The method of claim 1, wherein:
    providing the label comprises:
       providing a graphic design at a back side of the label before positioning the mold compound over the label;
    positioning the label in the mold apparatus comprises:
       positioning the label in a recess of the mold apparatus such that the back side of the label faces away from a bottom of the recess;
    and
    the label is at least one of translucent or transparent.

11. The method of claim 1, wherein:
providing the label comprises:
  providing an adhesive layer at a back side of the label before positioning the mold compound over the label; and
  the adhesive layer is heat-activated to bond to the mold compound when positioning the mold compound over the label.

12. The method of claim 1, wherein:
providing the mold apparatus comprises:
  providing a hopper;
  providing a conduit coupled to the hopper; and
  providing a mold plate coupled to the conduit;
and
providing the mold compound in the non-solid form comprises:
  providing the mold compound into the conduit via the hopper;
  applying heat to the conduit to achieve the non-solid form of the mold compound; and
  providing the mold compound from the conduit to the mold plate.

13. The method of claim 1, wherein:
positioning the label in the mold apparatus comprises:
  positioning the label directly over the mold apparatus to physically contact the mold apparatus.

14. The method of claim 1, wherein:
providing the label comprises:
  providing the label to comprise a pre-formed front face portion of the face plate prior to positioning the label in the mold apparatus.

15. A method of manufacturing a golf putter comprising:
providing a face plate comprising a label, wherein providing the face plate comprises;
  providing a mold apparatus;
  providing the label;
  positioning the label in the mold apparatus;
  providing a mold compound in a non-solid form;
  positioning the mold compound over the label and in the mold apparatus;
  changing the mold compound from the non-solid form to a solid form to form the face plate; and
  removing the face plate from the mold apparatus;
inserting the face plate into a face opening of a golf club head of the golf putter;
securing the face plate in the face opening of the golf club head; and
coupling the golf club head to a shaft;
wherein providing the mold compound further comprises:
  providing the mold compound to comprise a polyester-based, aromatic, polyurethane, thermoplastic having a Shore D hardness value of approximately 65 to approximately 80 .

16. The method of claim 15 wherein:
providing the label comprises:
  providing a liner coupled to the label, the liner being removable from the label; and
positioning the label in the mold apparatus comprises:
  positioning the label and the liner in the mold apparatus such that the liner faces the mold apparatus.

17. A method of manufacturing a golf putter, the method comprising:
providing a face plate;
inserting the face plate into a face opening of a golf club head of the golf putter; and
securing the face plate in the face opening of the golf club head;
wherein:
  providing the face plate comprises:
    providing a mold apparatus comprising a mold plate, the mold plate comprising a cavity;
    providing a label in the cavity of the mold plate;
    providing a mold compound in a non-solid form over the label and into the cavity via the mold apparatus;
    changing the mold compound from the non-solid form to a solid form while in the mold plate to form the face plate; and
    removing the face plate from the mold apparatus;
  providing the mold apparatus comprises:
    providing a conduit coupled to the mold plate;
  providing the label comprises:
    providing a design at a back side of the label, the back side of the label facing away from a bottom of the cavity of the mold plate, the design visible through a front side of the label;
  and
  providing the mold compound in the non-solid form comprises:
    providing the mold compound to comprise a polyester-based, aromatic, polyurethane, thermoplastic with a Shore D hardness value of approximately 65 to approximately 80 ;
    providing the mold compound into the conduit; and
    heating the mold compound into the non-solid form while in the conduit.

18. The method of claim 17, wherein:
providing the mold apparatus comprises:
  providing a gate coupled to the cavity;
  providing a runner coupled between the gate and the conduit; and
  providing a screw mechanism to direct the mold compound in the conduit towards the runner of the mold apparatus;
and
providing the mold compound in the non-solid form over the label comprises:
  routing the mold compound from the runner to the cavity via the gate.

19. The method of claim 18, wherein:
providing the gate comprises:
  positioning the gate to be located above the label in the cavity; and
  configuring the gate to regulate the routing of the mold compound from the runner to the cavity to restrict at least one of a deformation, a wrinkling, or a movement of the label in the cavity.

20. The method of claim 17, wherein:
changing the mold compound from the non-solid form to the solid form while in the mold plate to form the face plate comprises:
  bonding the label and the mold compound together into a single piece with the design secured between the label and the mold compound.

* * * * *